US008270135B2

(12) United States Patent
Thiele

(10) Patent No.: US 8,270,135 B2
(45) Date of Patent: Sep. 18, 2012

(54) TRANSISTOR HALF-BRIDGE CONTROL

(75) Inventor: Steffen Thiele, Munich (DE)

(73) Assignee: Infineon Technologies Austria AG, Villach (AT)

( * ) Notice: Subject to any disclaimer, the term of this patent is extended or adjusted under 35 U.S.C. 154(b) by 151 days.

(21) Appl. No.: 12/833,480

(22) Filed: Jul. 9, 2010

(65) Prior Publication Data

US 2012/0008238 A1    Jan. 12, 2012

(51) Int. Cl.
*H02H 3/08* (2006.01)
*H02H 9/02* (2006.01)
*H02H 3/00* (2006.01)
(52) U.S. Cl. .......................... 361/93.1; 361/94
(58) Field of Classification Search ............. 361/93.1
See application file for complete search history.

(56) References Cited

U.S. PATENT DOCUMENTS 5,708,578 A * 1/1998 Stoddard et al. ............. 363/98
2006/0221528 A1* 10/2006 Li et al. ....................... 361/100

\* cited by examiner

*Primary Examiner* — Dharti Patel
(74) *Attorney, Agent, or Firm* — Slater & Matsil, L.L.P.

(57) ABSTRACT

A circuit for driving a transistor half bridge is disclosed that comprises a series circuit of a first and a second transistor both having intrinsic or external free-wheeling diodes coupled in parallel. The circuit for driving a transistor half bridge comprises: an over-current detection circuit that is configured to signal an over-current condition when a load current flowing through the first transistor exceeds a first threshold; a protection circuit that is coupled to the over-current detection circuit and that is configured to disable an activation of the first transistor in response to a detected over-current and to re-enable the activation of the first transistor after a first time interval has elapsed; an evaluation circuit that is coupled to the over-current detection circuit and that is configured to check whether a further over-current condition is detected within a second time interval that follows the first time interval. An active free-wheeling by activating the second transistor is disabled when a further over-current condition is detected within the second time interval, and an active free-wheeling by activating the second transistor is enabled during the first time interval when no further over-current condition is detected within the second time interval.

25 Claims, 1 Drawing Sheet

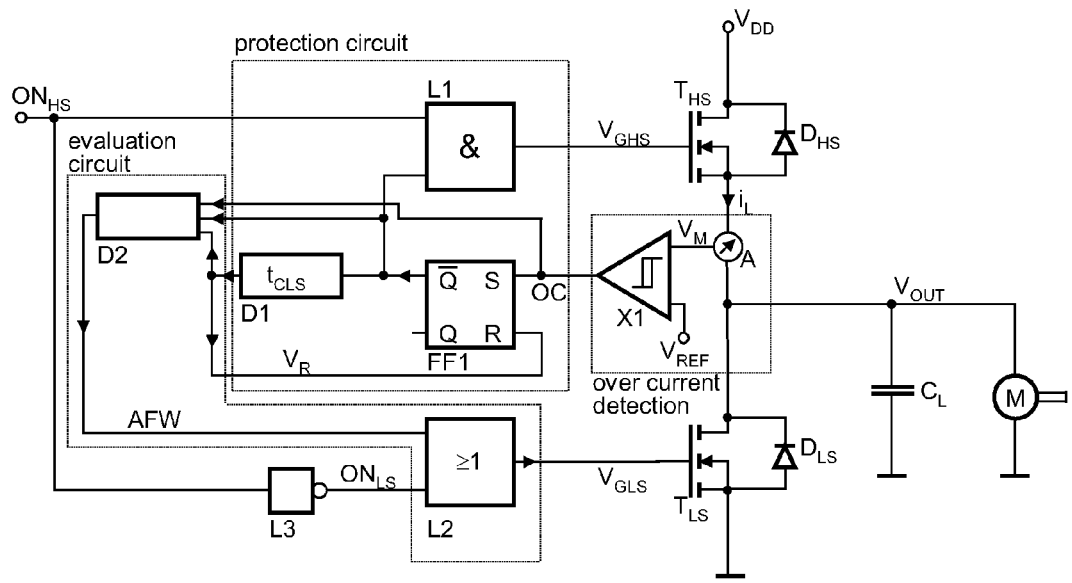
FIG. 1
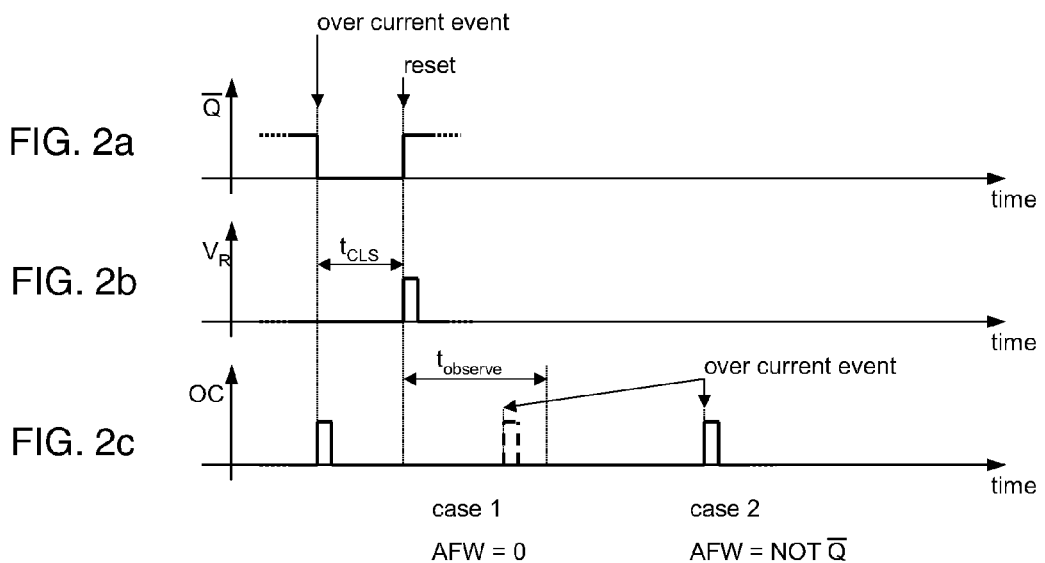
FIG. 2a
FIG. 2b
FIG. 2c

TRANSISTOR HALF-BRIDGE CONTROL

TECHNICAL FIELD

The present disclosure relates to a circuit for controlling the switching states of power transistors arranged in a transistor half-bridge.

BACKGROUND

Transistor half-bridges as well as so-called H-bridges are often used in DC motor driver applications. When switching inductive loads, the driver circuit provides a free-wheeling current path in order to protect the transistors employed in the half-bridges. When using standard MOSFETs as switching transistors a free-wheeling path is provided "automatically" by the intrinsic reverse diode present in the MOSFETs. When using other types of transistors, such as, for example, IGBTs, external free-wheeling diodes may be connected in parallel to the load paths of the transistors. A driver circuit relying only on (intrinsic or external) free-wheeling diodes connected parallel to the transistor load paths implements so-called passive free-wheeling.

When driving inductive loads, for example, with PWM operation, the dissipated power can be significantly reduced by activating the transistor located parallel to the intrinsic free-wheeling diode. A driver circuit that is configured to activate the transistors connected parallel to the free-wheeling implements so-called passive free-wheelings. Active free-wheeling is implemented in present integrated H-bridge driver circuits such as, for example, Infineon's TLE 6209 R and STMicroelectronics' L99H01.

When driving capacitive loads, such as, for example, DC motors having a capacitor connected in parallel, an active free-wheeling may be inappropriate as the capacitor may discharge through the actively enabled transistor current path and consequently passive free-wheeling may be more useful in such situations.

There is a need for versatile driver circuits for controlling the switching states of power transistors arranged in a transistor half-bridge, wherein the driver circuits may make use of the advantages of both types of free-wheeling.

SUMMARY OF THE INVENTION

One example of the invention relates to a circuit for driving a transistor half bridge that includes a series circuit of a first and a second transistor both having intrinsic or external free-wheeling diodes coupled in parallel. The circuit for driving the transistor half bridge comprises: an over-current detection circuit that is configured to signal an over-current when a load current flowing through the first transistor exceeds a first threshold; a protection circuit that is coupled to the over-current detection circuit and that is configured to disable an activation of the first transistor in response to a detected over-current and to re-enable the activation of the first transistor after a first time interval has elapsed; and an evaluation circuit that is coupled to the over-current detection circuit and that is configured to check whether an over-current is detected within a second time interval that follows the first time interval. An active free-wheeling by activating the second transistor is disabled when an over-current is detected within the second time interval, and an active free-wheeling by activating the second transistor is enabled during the first time interval when no over-current is detected within the second time interval.

Another example of the invention relates to a corresponding method.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 1 is a circuit diagram of a half bridge driver circuit in accordance with one exemplary embodiment; and FIG. 2a, FIG. 2b, and FIG. 2c (collectively FIG. 2) illustrate by means of timing diagrams the function of the embodiment of FIG. 1.

DETAILED DESCRIPTION OF ILLUSTRATIVE EMBODIMENTS

FIG. 1 illustrates an exemplary implementation of a circuit for driving a transistor half bridge in accordance with one aspect of the present invention. It should be noted that a skilled person may easily find numerous equivalent or similar circuits performing essentially the same function without leaving the scope of the invention. Further, it should be noted that an actual implementation may include many additional features which may be useful to have in driver circuits used for transistor control, although, for the sake of simplicity and conciseness, the examples illustrated herein only include some of these features which are necessary for the following discussion.

FIG. 1 illustrates a half-bridge circuit that includes a high side semiconductor switch $T_{HS}$ and a low side semiconductor switch $T_{LS}$. The high side semiconductor switch $T_{HS}$ is connected between a first supply node at an upper supply potential $V_{DD}$ and an output node. The low side semiconductor switch $T_{LS}$ is connected between the output node and a second supply node at a lower supply potential, e.g., ground potential GND. The potential difference between the potential at the output node and the ground potential GND is the output voltage $V_{OUT}$. Each semiconductor switch $T_{HS}$, $T_{LS}$ has a corresponding free-wheeling diode $D_{HS}$, $D_{LS}$ connected in parallel which may be, in the case of MOSFETs, an intrinsic diode.

A load is connected to the output node and thus being supplied with output voltage $V_{OUT}$. In the present example the load is represented by a parallel circuit of a DC-motor M and a capacitor $C_L$ for eliminating interferences.

FIG. 1 further illustrates circuitry used for driving the control electrodes (e.g., the transistor gates in the case of MOSFETs or IGBTs) of the semiconductor switches $T_{HS}$, $T_{LS}$ as well as for over-current protection. The driver signals $V_{GHS}$, $V_{GLS}$ supplied to the gates of the transistors $T_{HS}$ and $T_{LS}$, respectively, are derived from an input control signal $ON_{HS}$ whereby, in the present example, the driver signal $V_{GHS}$ for the high side transistor $T_{HS}$ follows essentially the control signal $ON_{HS}$ whereas the driver signal $V_{GLS}$ for the low side transistor $T_{LS}$ is essentially an inverted version (see inverter L3) of the control signal $ON_{HS}$. In practical implementations circuitry may be necessary for inserting some delays between the edges of the driver signals $V_{GHS}$ and $V_{GLS}$ in order to prevent shoot-through effects. However, such shoot-through protection is well known and not further discussed here for the sake of simplicity.

Further, the circuit of FIG. 1 includes an over-current detection circuit that, in the present example, includes a current sense unit A and a comparator X1. The current sense unit A provides a current sense signal $V_M$ representing the load current $i_L$ through the high side transistor $T_{HS}$, and the comparator is configured to compare the current sense signal $V_M$ with a reference signal $V_{REF}$ and to signal at its output whether the actual load current $i_L$ exceeds a given threshold defined by the reference signal $V_{REF}$. The output signal of the comparator X1 is denoted as OC.

The output signal of the comparator X1 (i.e., the over-current signal OC) is supplied to a protection circuit that that is configured to disable an activation (by an appropriate control signal $ON_{HS}$) of the high side transistor $T_{HS}$ in response to a detected over-current and to re-enable the activation of the high side transistor $T_{HS}$ after a recovery time interval $t_{CLS}$ has elapsed. This recovery time interval $t_{CLS}$ may be predefined in the circuit design or user-definable dependent on the actual application.

Disabling and re-enabling the activation of the high side transistor in response to a detected over-current may be achieved by a gate L1 that is configured to blank the control signal $ON_{HS}$ being supplied to the gate of the high side transistor (as driver signal $V_{GHS}$) for driving it in an on or an off state. In the present example, the gate L1 is an AND-gate configured to blank the control signal $ON_{HS}$ during the recovery time interval $t_{CLS}$ after an over-current condition has been detected. Thus the high side transistor $T_{HS}$ is switched off during the recovery time interval $t_{CLS}$. In the present example the blanking signal is $\overline{Q}$ (read: not Q) provided by the inverting output of a SR-latch FF1. In order to provide an appropriate (low) logic level as a blanking signal, the SR-latch has to be set in case an over-current condition is detected and reset after the recovery time interval $t_{CLS}$ has elapsed. Therefore the over-current signal OC is supplied to a set input S of the SR-latch FF1. An appropriate reset signal is supplied to the reset input R of the SR-latch FF1 at the end of the time interval $t_{CLS}$ by a delay element D1. The function of the delay element D1 and other circuit components is described later with reference to the timing diagrams of FIG. 2.

Summarizing the above, the protection circuit provides the function of disabling the activation of the high side transistor $T_{HS}$ for a time period $t_{CLS}$ in response to a detected over-current condition by blanking the respective activation signal, i.e., the control signal $ON_{HS}$. This function may be implemented using a gate L1 and timing circuit which includes the SR-latch FF1 and the delay element D1. The Boolean function implemented by the AND-gate L1 may be written as $V_{GHS} = ON_{HS}$ AND $\overline{Q}$, whereby $\overline{Q}$ is low only during the time interval $t_{CLS}$.

The circuit of FIG. 1 further includes an evaluation circuit that is configured to determine whether to use active free-wheeling or passive free-wheeling during an over-current switch off of the high side transistor $T_{HS}$, i.e., during the recovery time interval. The evaluation circuit is coupled to the over-current detection circuit and is configured to check whether or not a further over-current condition is detected within a second time interval that follows the recovery time interval $t_{CLS}$. Active free-wheeling by activating the low side transistor $T_{LS}$ during the recovery time interval $t_{CLS}$ is disabled when a further over-current condition is detected within the second time interval $t_{observe}$. Otherwise, i.e. when no further over-current condition is detected within the second time interval $t_{observe}$, active free-wheeling is enabled during the first time interval $t_{CLS}$.

For implementing this function the evaluation circuit may include a further delay element D2 that receives the reset signal $V_R$ (also supplied to the reset input R of the SR latch). The reset signal $V_R$ indicates the end of the recovery time interval $t_{CLS}$ that triggers the subsequent second time interval $t_{observe}$. The second time interval $t_{observe}$ defines a "time window" in which the further delay element D2 monitors the over-current signal OC thus observing whether further over-current conditions occur within the time window $t_{observe}$. When a further over-current condition is observed within the time interval $t_{observe}$ after re-enabling the activation of the transistor $T_{HS}$, then passive free-wheeling is used during subsequent over-current switch-offs. Otherwise active free-wheeling is used and the low-side transistor $T_{LS}$ is activated during subsequent recovery time intervals.

In the latter case an active free-wheeling signal AFW, provided by the delay element D2, is set to $$\text{AFW} = \text{NOT } Q = \overline{Q}, \tag{1}$$

otherwise AFW is set to $$\text{AFW} = 0. \tag{2}$$

According to the Boolean equation (1) the active free-wheeling signal AFW is high (i.e., active) during the recovery time period if active free-wheeling is to be used. In order to activate the low side transistor $T_{LS}$ thus providing a low ohmic current path in parallel to the free-wheeling diode $D_{LS}$ the active free-wheeling signal AFW is combined with the inverted control signal $ON_{HS}$ such that the resulting low side driver signal $V_{GLS}$ equals $V_{GLS} = (\text{NOT } ON_{HS})$ OR AFW. In the present examples the signals $ON_{HS}$ and AFW are combined using the OR-gate L2 as illustrated in FIG. 1.

It should be noted that logic levels (low level, high level) may be interchangeable when slightly adapting the logic circuits. For example, the inverter L3 and the OR-gate L2 may be replaced by a NAND-gate receiving the control signal $ON_{HS}$ and the active free-wheeling signal AFW. In this case a low level of the signal AFW indicates the recovery period during which the low side transistor is activated for active free-wheeling.

The function of the exemplary circuit of FIG. 1 is summarized below and further explained referring to the timing diagrams of FIG. 2. A circuit in accordance with one exemplary embodiment of the invention implements a method for driving a transistor half bridge that includes a series circuit of the transistors $T_{HS}$ and $T_{LS}$ both having free-wheeling diodes coupled in parallel as also illustrated in FIG. 1.

The method includes detecting whether a load current $i_L$ flowing through the high side transistor exceeds a first threshold (e.g., defined by a reference voltage $V_{REF}$). Such exceedance indicates an over-current condition and an over current signal OC may be set to an appropriate logic level to signal the over-current condition. This is illustrated in the timing diagram of FIG. 2c where each pulse in the signal OC indicates an over-current condition (labeled as "over-current events").

The method further includes disabling an activation of the transistor $T_{HS}$ in response to a detected over-current condition. This is illustrated in the timing diagram of FIG. 2a where the SR-latch output $\overline{Q}$ (which is used as blanking signal as explained above) is set to allow level in response to a pulse in the over-current signal OC (which is used as set signal of the SR-lath FF1). Further, after a recovery time interval $t_{CLS}$ has elapsed, the gate of the high side transistor $T_{HS}$ is unblocked and an activation of the transistor thus re-enabled. This can be seen in the timing diagram of FIG. 2a where the blanking signal $\overline{Q}$ is reset to high after expiration of the recovery time period. The timing diagram of FIG. 2b illustrates the corresponding reset pulse of the reset signal $V_R$ supplied to the SR-latch FF1.

In order to decide whether to use active free-wheeling or not, the method further includes checking whether a further over-current condition is detected within an observation time interval $t_{observe}$ that subsequently follows the recovery time interval $t_{CLS}$. The time window defined by the observation time interval $t_{observe}$ is illustrated in the timing diagram of FIG. 2c.

In the following, two cases can be discriminated:

Case 1: When an over-current condition is detected within the observation time interval $t_{observe}$, then an active free-wheeling by activating the low side transistor $T_{LS}$ is disabled and free-wheeling may only take place passively via the free-wheeling diode $D_{LS}$ (see timing diagram of FIG. 2c).

Case 2: When no over-current condition is detected within the observation time interval $t_{observe}$, then an active free-wheeling is enabled.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A circuit for driving a transistor half bridge that comprises a series circuit of a first transistor and a second transistor each having a respective intrinsic or external free-wheeling diode coupled in parallel, the circuit comprising:
   an over-current detection circuit configured to signal an over-current condition when a load current flowing through the first transistor exceeds a first threshold;
   a protection circuit coupled to the over-current detection circuit and configured to disable an activation of the first transistor in response to a detected over-current and to re-activate the first transistor after a first time interval has elapsed;
   an evaluation circuit coupled to the over-current detection circuit and configured to check whether a further over-current condition is detected within a second time interval that follows the first time interval,
   wherein, in response to an over-current event, the first transistor is switched off during the first time interval in order to stop current flow and protect the circuit from thermal breakdown; and
   wherein, after the re-activation of the first transistor, the load current starts to flow again, and, if a second over-current event occurs during the second time interval, then active free-wheeling is not used during following over-current switch-offs, otherwise passive free-wheeling is used.

2. The circuit of claim 1, wherein the protection circuit comprises:
   a first gate configured to blank a first activation signal being supplied to the first transistor for driving it in an on or an off state in accordance with a signal level of the first activation signal.

3. The circuit of claim 2, wherein the protection circuit comprises:
   a timing circuit configured to supply a blanking signal to the first gate in response to a detected over-current, the blanking signal being active throughout the first time interval.

4. The circuit of claim 3, wherein the timing circuit comprises an SR-latch that is set in response to a detected over-current and reset after the first time interval has elapsed, an output signal of the SR-latch being used as the blanking signal.

5. The circuit of claim 1, wherein the evaluation circuit comprises:
   a delay circuit defining the second time interval starting at the end of the first time interval; and
   circuitry configured to activate an active free-wheeling signal when no further over-current is detected during the second time interval and to deactivate the active free-wheeling signal in response to a further over-current detection within the second time interval, thus enabling and disabling active free-wheeling.

6. The circuit of claim 5, wherein the evaluation circuit comprises:
   a second gate circuit configured to combine a second activation signal and the active free-wheeling signal, wherein the second activation signal is supplied to the second transistor for driving it into an on or an off state in accordance with a signal level of the second activation signal, and wherein the combined signal is active if either the second activation signal or the active free-wheeling signal is active.

7. A circuit comprising:
   a first semiconductor switch with a current path coupled between a first supply voltage node and an output node;
   a second semiconductor switch with a current path coupled between the output node and a second supply voltage node;
   an over-current detection unit with an input coupled to the output node;
   a protection circuit with a first input coupled to an input node, a second input coupled to an output of the over-current detection unit, and a first output coupled to a control input of the first semiconductor switch; and
   an evaluation circuit with an input coupled to a second output of the protection circuit and an output coupled to a control input of the second semiconductor switch, the evaluation circuit comprising
   a delay element having an input that is the input of the evaluation circuit, and
   a logic element having a first input coupled to an output of the delay element, a second input coupled to the input node, and an output that is the output of the evaluation circuit.

8. The circuit of claim 7, wherein the first semiconductor switch comprises a first transistor and wherein the second semiconductor switch comprises a second transistor.

9. The circuit of claim 8, further comprising a first free-wheeling diode coupled in parallel with the first transistor and a second free-wheeling diode coupled in parallel with the second transistor.

10. The circuit of claim 7, wherein the first supply voltage node carries a first supply voltage and the second supply voltage node carries a second supply voltage, the first supply voltage greater than the second supply voltage.

11. The circuit of claim 7, wherein the over-current detection unit comprises:
   a current sense unit with a current path coupled in series with the current path of the first semiconductor switch; and
   a comparator with an input coupled to a signal output of the current sense unit, an output of the comparator being the output of the over-current detection unit.

12. The circuit of claim 7, wherein the protection circuit comprises:
a gate having a first input that is the first input of the protection circuit and an output of the gate being the first output of the protection circuit;
a latch having a first input that is the second input of the protection circuit and an output coupled to a second input of the gate; and
a delay element having an input coupled to the output of the latch and an output coupled to a second input of the latch.

13. The circuit of claim 12, wherein the latch comprises a set-reset flip-flop.

14. The circuit of claim 7, wherein the logic element comprises:
an inverter having an input that is the second input of the logic element; and
a gate having a first input that is the first input of the logic element, a second input coupled to an output of the inverter and an output that is the output of the logic element.

15. The circuit of claim 7, wherein the over-current detection unit comprises:
a current sense unit with a current path coupled in series with the current path of the first semiconductor switch; and
a comparator with an input coupled to a signal output of the current sense unit, an output of the comparator being the output of the over-current detection unit; wherein the protection circuit comprises:
a gate having a first input that is the first input of the protection circuit and an output of the gate being the first output of the protection circuit;
a latch having a first input that is the second input of the protection circuit and an output coupled to a second input of the gate; and
a delay element having an input coupled to the output of the latch and an output coupled to a second input of the latch.

16. The circuit of claim 7, wherein:
the over-current detection unit is configured to signal an over-current condition when a load current flowing through the first semiconductor switch exceeds a first threshold;
the protection circuit is configured to disable an activation of the first semiconductor switch in response to a detected over-current and to re-enable the activation of the first semiconductor switch after a first time interval has elapsed; and
the evaluation circuit is configured to check whether a further over-current condition is detected within a second time interval that follows the first time interval.

17. The circuit of claim 16, wherein, in response to an over-current event, the first semiconductor switch is switched off during the first time interval in order to stop current flow and protect the circuit from thermal breakdown; and
wherein, after the re-activation of the first semiconductor switch, the load current starts to flow again, and, if a second over-current event occurs during the second time interval, then active free-wheeling is not used during following over-current switch-offs, otherwise passive free-wheeling is used.

18. The circuit of claim 16, wherein an active free-wheeling is disabled by activating the second semiconductor switch when a further over-current condition is detected within the second time interval, and
wherein an active free-wheeling is enabled during the first time interval by activating the second semiconductor switch when no further over-current condition is detected within the second time interval.

19. The circuit of claim 1, wherein
an active free-wheeling by activating the second transistor is enabled during the first time interval when no further over-current condition is detected within the second time interval; and
the active free-wheeling by activating the second transistor is disabled when a further over-current condition is detected within the second time interval.

20. A method for driving a transistor half bridge that comprises a series circuit of a firs transistor and a second transistor both having a respective intrinsic or external free-wheeling diode coupled in parallel, the method comprising:
detecting if a load current flowing through the first transistor exceeds a first threshold and, if so, indicating an over-current condition;
disabling an activation of the first transistor in response to a detected over-current re-enabling the activation of the first transistor after a first time interval has elapsed;
checking whether a further over-current condition is detected within a second time interval that follows the first time interval;
disabling, when an over-current condition is detected within the second time interval, an active free-wheeling by activating the second transistor; and
enabling, when no over-current condition is detected within the second time interval, an active free-wheeling by activating the second transistor during the first time interval.

21. The method of claim 20, wherein the disabling the activation of the first transistor comprises blanking a first activation signal supplied to the first transistor using a first gate.

22. The method of claim 21, wherein blanking the first activation signal comprises using a timing circuit to supply a blanking signal to the first gate in response to the detected over-current.

23. the method of claim 22, wherein using the timing circuit comprises setting an SR-latch in response to the detected over-current and resetting the SR latch after the first time interval has elapsed, wherein an output signal of the SR-latch is used as the blanking signal.

24. The method of claim 20, further comprising:
starting the second time interval at the end of the first time interval; and
using a delay circuit to define the second time interval.

25. The method of claim 24, wherein activating the second transistor comprises:
combining a second activation signal and an active free-wheeling signal using a second gate circuit to faun a combined signal using a second gate, wherein the combined signal is active when either the second activation signal or the active free-wheeling signal is active; and
turning on the second transistor when the combined signal is active.

\* \* \* \* \*